United States Patent
Lakshmanamurthy et al.

(10) Patent No.: US 7,426,610 B2
(45) Date of Patent: Sep. 16, 2008

(54) ON-DEVICE PACKET DESCRIPTOR CACHE

(75) Inventors: Sridhar Lakshmanamurthy, Sunnyvale, CA (US); Hugh Miller Wilkinson, III, Newton, MA (US)

(73) Assignee: Intel Corporation, Santa Clara, CA (US)

( * ) Notice: Subject to any disclaimer, the term of this patent is extended or adjusted under 35 U.S.C. 154(b) by 241 days.

(21) Appl. No.: 11/321,815

(22) Filed: Dec. 29, 2005

(65) Prior Publication Data

US 2007/0153818 A1 Jul. 5, 2007

(51) Int. Cl.
*G06F 12/00* (2006.01)
(52) U.S. Cl. ...................................... 711/118
(58) Field of Classification Search ........................ None
See application file for complete search history.

(56) References Cited

U.S. PATENT DOCUMENTS

| | | | | |
|---|---|---|---|---|
| 6,064,676 | A * | 5/2000 | Slattery et al. | 370/412 |
| 6,111,896 | A * | 8/2000 | Slattery et al. | 370/535 |
| 6,148,082 | A * | 11/2000 | Slattery et al. | 380/212 |
| 6,195,368 | B1 * | 2/2001 | Gratacap | 370/535 |
| 6,246,701 | B1 * | 6/2001 | Slattery | 370/503 |
| 6,292,490 | B1 * | 9/2001 | Gratacap et al. | 370/412 |
| 6,351,471 | B1 * | 2/2002 | Robinett et al. | 370/468 |
| 6,351,474 | B1 * | 2/2002 | Robinett et al. | 370/486 |
| 6,744,785 | B2 * | 6/2004 | Robinett et al. | 370/486 |
| 7,046,628 | B2 * | 5/2006 | Luhmann et al. | 370/230 |
| 7,061,942 | B2 * | 6/2006 | Noronha et al. | 370/537 |
| 7,245,615 | B1 * | 7/2007 | Potter et al. | 370/389 |
| 7,266,120 | B2 * | 9/2007 | Cheng et al. | 370/390 |
| 7,366,865 | B2 * | 4/2008 | Lakshmanamurthy et al. | 711/170 |
| 2002/0126711 | A1 * | 9/2002 | Robinett et al. | 370/535 |
| 2002/0131443 | A1 * | 9/2002 | Robinett et al. | 370/442 |
| 2003/0058852 | A1 * | 3/2003 | Luhmann et al. | 370/389 |
| 2004/0062245 | A1 * | 4/2004 | Sharp et al. | 370/392 |
| 2004/0095934 | A1 * | 5/2004 | Cheng et al. | 370/390 |
| 2004/0210663 | A1 * | 10/2004 | Phillips et al. | 709/230 |
| 2004/0250059 | A1 * | 12/2004 | Ramelson et al. | 713/150 |
| 2004/0258072 | A1 * | 12/2004 | Deforche | 370/395.4 |
| 2005/0025140 | A1 * | 2/2005 | Deforche et al. | 370/363 |
| 2005/0060414 | A1 * | 3/2005 | Phillips et al. | 709/227 |
| 2005/0105486 | A1 * | 5/2005 | Robinett et al. | 370/321 |
| 2005/0147038 | A1 * | 7/2005 | Chandra et al. | 370/235 |
| 2005/0182841 | A1 * | 8/2005 | Sharp | 709/228 |
| 2006/0069869 | A1 * | 3/2006 | Lakshmanamurthy et al. | 711/118 |
| 2006/0072563 | A1 * | 4/2006 | Regnier et al. | 370/389 |

* cited by examiner

*Primary Examiner*—Kevin Verbrugge
(74) *Attorney, Agent, or Firm*—Libby H. Hope (57) ABSTRACT

In an embodiment, a method is provided. The method of this embodiment provides in response to receiving a packet at a packet processing device having a memory ("on-device memory"), storing the packet at a location in a memory not on the packet processing device ("off-device memory"); creating a packet descriptor corresponding to the packet, the packet descriptor referencing the location; storing the packet descriptor in a packet descriptor queue on the off-device memory; and storing a packet descriptor copy on the on-device memory.

21 Claims, 13 Drawing Sheets

ON-DEVICE PACKET DESCRIPTOR CACHE

FIELD

Embodiments of this invention relate to an on-device packet descriptor cache.

BACKGROUND

When packets are received, they are typically placed in queues where they may be scheduled for later transmission. Scheduling algorithms, such as weighted fair queuing ("WFQ") and deficit round robin ("DRR"), may be used to satisfy sophisticated QoS (quality of service) requirements in certain applications and/or equipment where thousands of queues may be supported at extremely high data rates. One example of this is broad-band access using service provider edge equipment. In such scheduling algorithms, the length of the queued packets is a required input to determine which packets to schedule next for transmission. However, since a large number of packet queues is usually required, typical processor architectures implement packet queues in external memory (e.g., a memory external to a network processor). For some applications, packet retrieval may be expensive in terms of read latency and consumed bandwidth.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Examples described below are for illustrative purposes only, and are in no way intended to limit embodiments of the invention. Thus, where examples may be described in detail, or where examples may be provided, it should be understood that the examples are not to be construed as exhaustive, and do not limit embodiments of the invention to the examples described and/or illustrated.

Figure 1:
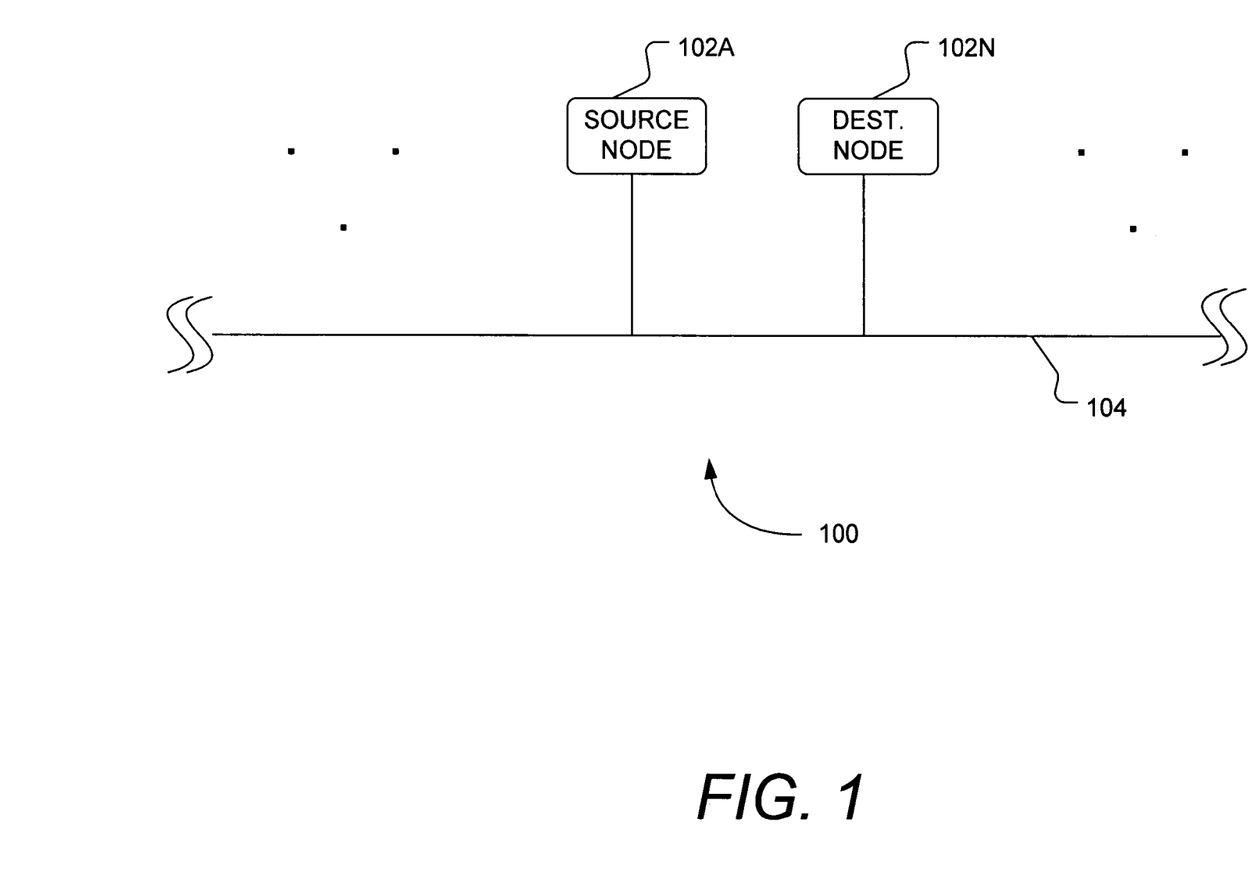
FIG. 1 illustrates a network according to an embodiment.

FIG. 1 is a block diagram illustrating a network 100 in accordance with embodiments of the invention. Network 100 may comprise a number of nodes 102A, ..., 102N, including a source node 102A, and a destination node 102N, connected by one or more communications media 104 (only one shown). A node refers to any device capable of communicating data, such as a computer, server, switch, router, bridge, gateway, personal digital assistant, mobile device and so forth. As used herein, a source node refers to a node that transmits data for delivery to destination node. A destination node as used herein refers to a node that is the intended recipient of data transmitted from a source node.

A communications medium 104 may include any medium capable of carrying information signals, such as twisted-pair wire, co-axial cable, fiber optics, radio frequencies, electronic, acoustic or optical signals, and so forth. Communication medium 104 may include any medium capable of carrying information signals, such as twisted-pair wire, co-axial cable, fiber optics, radio frequencies, optical and/or electrical cables, although many alternatives are possible. For example, communication medium 104 may comprise air and/or vacuum, through which nodes 102A, ... 102N may wirelessly transmit and/or receive sets of one or more signals.

In general operation, data may be generated from an originating node for transmission to one or more intended recipients, herein called target nodes. Originating node may send data to target node(s) through one or more intermediate nodes, such as routers and/or switches. Originating node may send the data to intermediate nodes. Intermediate nodes may receive the data, store it briefly, and pass it to the next intermediate node or to a target node. Target node may eventually receive the data and may use it to reproduce the original data sent by originating node. As used herein, a source node 102A may refer to an originating node, a target node, or an intermediate node that transmits data; and a destination node 102N may refer to an originating node, an intermediate node, or a target node, that receives data.

Figure 2:
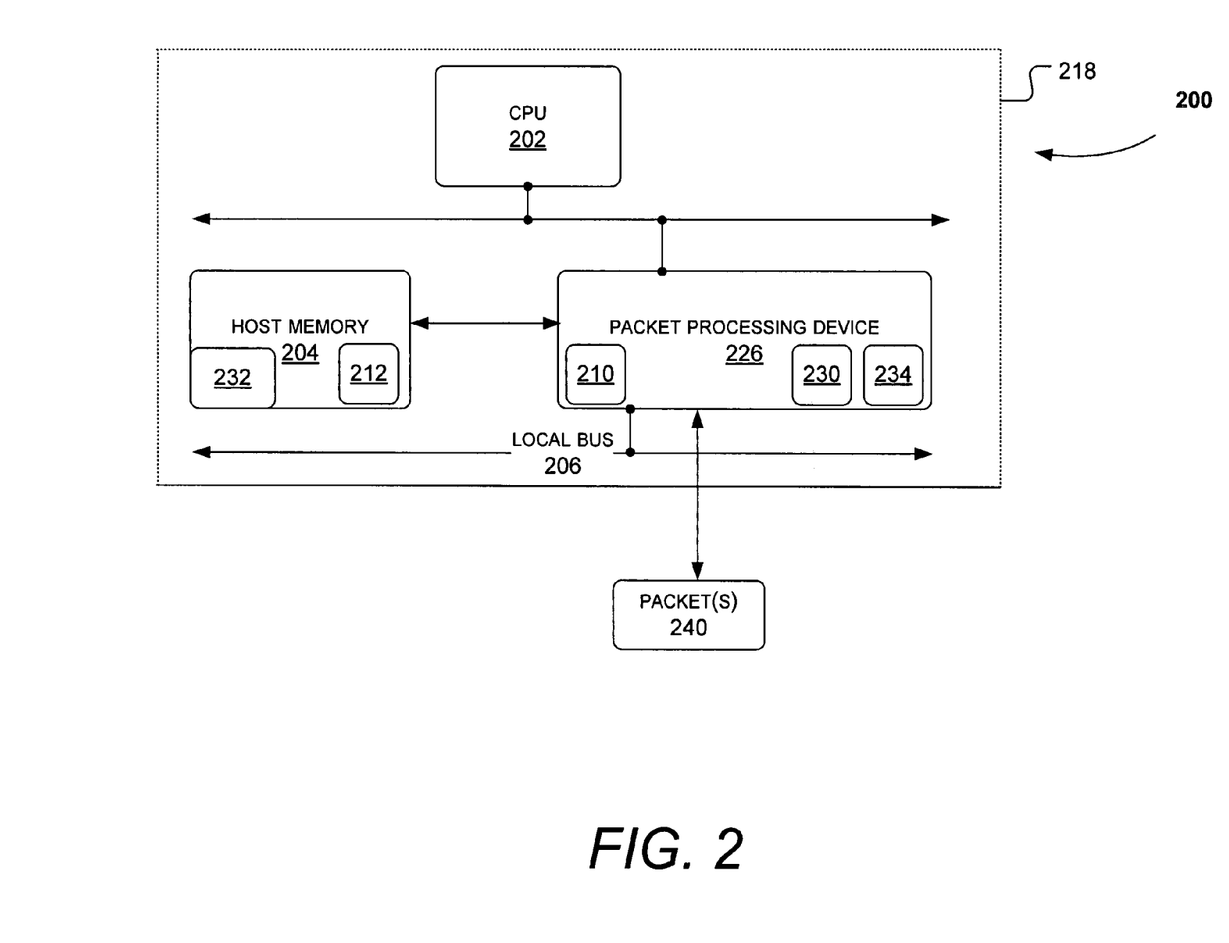
FIG. 2 illustrates a system according to an embodiment.

One or more of nodes 102A, ..., 102N may comprise system 200 as illustrated in FIG. 2. System 200 may comprise one or more processors 202 (only one shown). A "processor" as discussed herein relates to a combination of hardware and software resources for accomplishing computational tasks. For example, a processor may comprise a system memory and processing circuitry (e.g., a central processing unit (CPU) or microcontroller) to execute machine-readable instructions for processing data according to a predefined instruction set, or may comprise just the processing circuitry. Furthermore, processor 202 may be part of an SMP (symmetrical multi-processing) system. Examples of processors include CPU's such as the Intel® Pentium® family of processors, or Intel® Xeon™ processor, both commercially available from Intel® Corporation. Of course, alternatively, any of processor 202 may comprise another type of processor, such as, for example, a microprocessor that is manufactured and/or commercially available from Intel® Corporation, or a source other than Intel® Corporation, without departing from embodiments of the invention.

Memory 204 may store machine-executable instructions 232 that are capable of being executed, and/or data capable of being accessed, operated upon, and/or manipulated by logic, such as logic 230. "Machine-executable" instructions as referred to herein relates to expressions which may be understood by one or more machines for performing one or more logical operations. For example, machine-executable instructions may comprise instructions which are interpretable by a processor compiler for executing one or more operations on one or more data objects. However, this is merely an example of machine-executable instructions and embodiments of the present invention are not limited in this respect. Memory 204 may, for example, comprise read only, mass storage, random access computer-accessible memory, and/or one or more other types of machine-accessible memories. The execution of program instructions 232 and/or the accessing, operation upon, and/or manipulation of this data by logic 230 for example, may result in, for example, system 200 and/or logic 230 carrying out some or all of the operations described herein. In an embodiment, memory may be comprised in a chip (memory chip) that is coupled to packet processing device 226.

Logic 230 may comprise hardware, software, or a combination of hardware and software (e.g., firmware). For example, logic 230 may comprise circuitry (i.e., one or more circuits), to perform operations described herein. Logic 230 may be hardwired to perform the one or more operations. For example, logic 230 may comprise one or more digital circuits, one or more analog circuits, one or more state machines, programmable logic, and/or one or more ASIC's (Application-Specific Integrated Circuits). Alternatively or additionally, logic 230 may be embodied in machine-executable instructions 232 stored in a memory, such as memory 204, to perform these operations. Alternatively or additionally, logic 230 may be embodied in firmware. Logic may be comprised in various components of system 200, including, for example, network controller 226 (as illustrated), processor 202, motherboard 218, and chipset (not shown). Logic 230 may be used to perform various functions by various components as described herein.

Data transmitted between source node 102A and destination node 102N may be encapsulated in packets 240. As used herein, a "packet" means a sequence of one or more symbols and/or values that may be encoded by one or more signals transmitted from at least one sender to at least one receiver. In an embodiment, system 200 may additionally comprise one or more packet processing devices 226 (only one shown). A "packet processing device" as referred to herein relates to a device that is operable to receive one or more packets, directly or indirectly, from a communication medium, and to transmit one or more packets, directly or indirectly, from a communication medium. In an embodiment, packet processing device 226 may comprise a network processor. Examples of network processors include the Intel® IXP family of network processors, which is commercially available from Intel® Corporation.

Alternatively, packet processing device 226 may comprise a network controller that may be coupled to a communication medium to transmit data to and/or receive data from other devices coupled to the communication medium, i.e., to send and receive network traffic. Such a network controller may communicate with other devices according to any one of several data communication formats such as, for example, communication formats according to versions of IEEE Std. 802.3, IEEE Std. 802.11, IEEE Std. 802.16, Universal Serial Bus, Firewire, asynchronous transfer mode (ATM), synchronous optical network (SONET) or synchronous digital hierarchy (SDH) standards. The IEEE specifications are available from IEEE Corporate Communications, 445 Hoes Lane, Piscataway, N.J., 08854. Network controller may be embodied in a NIC (network interface card), on a circuit board, such as system motherboard 218, or integrated onto a chipset. In an embodiment, packet processing device 226 may comprise a NIC attached to server 200.

In an embodiment, packet processing device 226 may be QoS-enabled. QoS refers to an architecture and/or protocols that improve network service over various technologies. For example, QoS may be implemented by assigning priorities to selected flows, and strategically allocating bandwidth. In an embodiment, packet processing device 226 may be QoS-enabled by virtue of supporting one or more scheduling algorithms. Scheduling algorithms may include, for example, WFQ. WFQ is a method of smoothing out the flow of data by classifying packets into flows. For example, packets may be classified into one of four categories including its source IP (Internet Protocol) address, destination IP address, source TCP (Transmission Control Protocol) address, or destination TCP address. (Alternatively, the last two categories may include source UDP (User Datagram Protocol) address, or destination UDP address.) WFQ may create bit-wise fairness, for example, by allowing each queue to be serviced fairly in terms of byte count. For example, if WFQ services a first queue having a 100-byte packet, then WFQ will service a second queue having 2 50-byte packets.

Alternatively, scheduling algorithm may include DRR. DRR can handle packets by calculating, for a given packet, the difference between a maximum packet size and the length of the packet. Packets that exceed the difference are held back until the next round of the scheduler. Other scheduling algorithms that may rely on packet length for scheduling determinations may be used without departing from embodiments of the invention.

Figure 3:
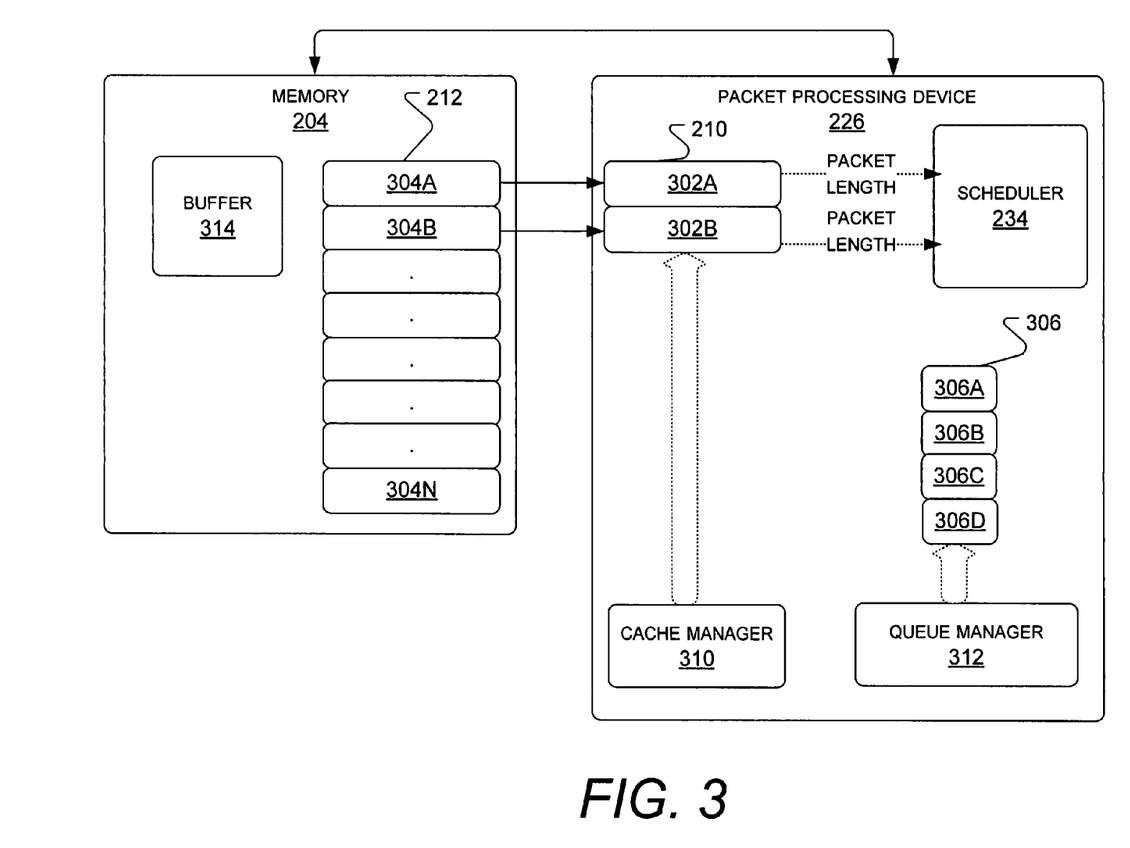
FIG. 3 illustrates a detailed system according to an embodiment.
Figure 4:
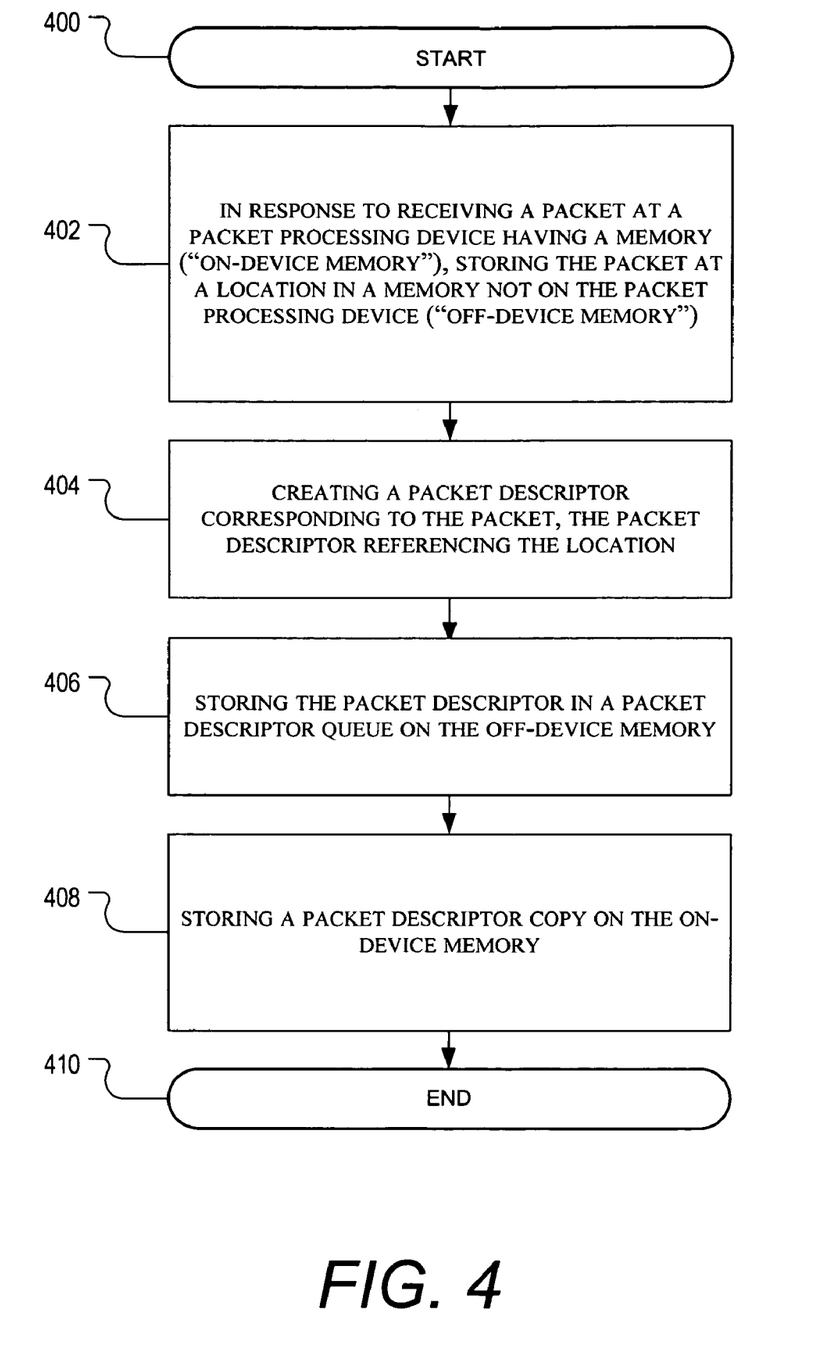
FIG. 4 a flowchart illustrating a method according to an embodiment.

FIG. 3 illustrates interaction between a memory 204 and packet processing device 226 in accordance with one embodiment of the invention. FIG. 4 is a flowchart illustrating a method in accordance with an embodiment of the invention in reference to FIG. 3. The method begins at block 400 and continues to block 402 where in response to receiving a packet at a packet processing device having a memory ("on-device memory"), storing the packet at a location in a memory not on the packet processing device ("off-device memory"). Off-device memory may also be referred to as external memory.

For example, in reference to FIGS. 2 and 3, packet 240 may be received at packet processing device 226 having on-device memory. In an embodiment, on-device memory may comprise cache 210, where cache 210 may have at least one cache entry 302A, 302B. Packet 240 may be stored at a location in an off-device memory, where off-device memory may comprise memory 204. The location in off-device memory where packet 240 may be stored may comprise buffer 314. However, embodiments of the invention are not limited to a particular type of location in memory.

At block 404, the method may comprise creating a packet descriptor corresponding to the packet, the packet descriptor referencing the location. In response to receiving packet 240, packet processing device 226 may create a packet descriptor corresponding to packet 240, where packet descriptor may reference buffer 314 in memory 204 where packet 240 is stored.

At block 406, the method may comprise storing the packet descriptor in a packet descriptor queue on the off-device memory. In an embodiment, packet descriptor queue 212 may comprise packet descriptors 304A, 304B, . . . , 304N, where each packet descriptor 304A, 304B, . . . , 304N may reference a location of packet 240 (e.g., buffer 314) stored in memory 204. For example, packet processing device 226 may store packet descriptors in packet descriptor queue 212 in memory 204. Although packets 240 and packet descriptors 304A, 304B, . . . , 304N are illustrated as being stored on a same memory 204, this is not a requirement in embodiments of the invention.

At block 408, the method may comprise storing a packet descriptor copy on the on-device memory. As used herein, "packet descriptor copy" may refer to a duplicate packet descriptor, or it may refer to a packet descriptor having a subset of information in the packet descriptor. In an embodiment, packet descriptor copy may be stored in cache 210. Packet descriptor copy may comprise any information on packet descriptor, so such information on on-device memory (e.g., cache 210) may be accessed faster by packet processing device 226 than if the information were accessed from the off-device memory (e.g., packet descriptor queue 212). In an embodiment, packet descriptor copy may comprise SOP (start of packet buffer), EOP (end of packet buffer), packet length, and buffer pointer. Packet descriptor copy may comprise additional information, or alternative information.

The method may end at block 410.

Figure 5:
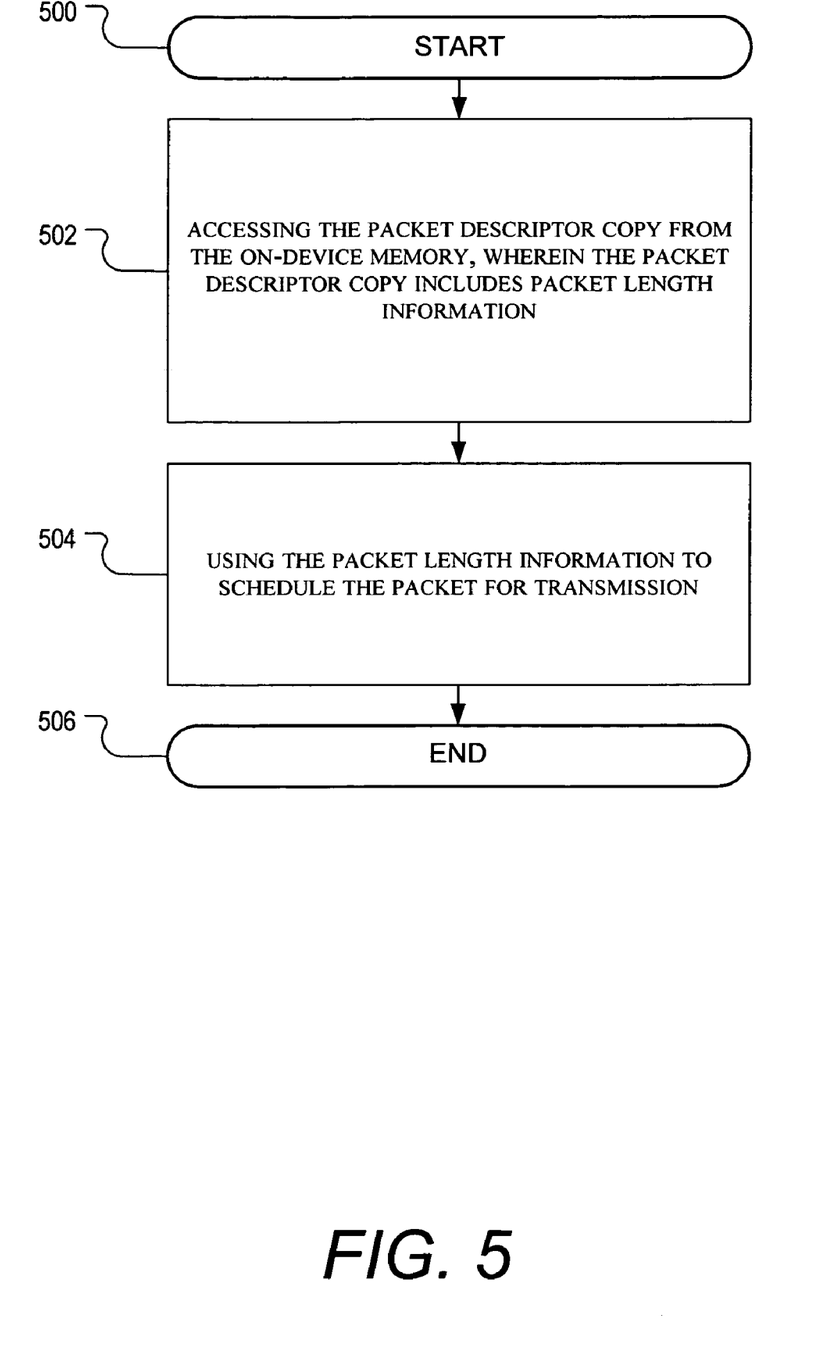
FIG. 5 a flowchart illustrating a method according to an embodiment.

FIG. 5 is a flowchart illustrating another method according to an embodiment of the invention. The method of FIG. 5 may continue from the method of FIG. 4, or may begin at block 500. The method may continue to block 502 where the method may comprise accessing the packet descriptor copy from the on-device memory, wherein the packet descriptor copy includes packet length information.

At block 504, the method may comprise using the packet length information to schedule the packet for transmission. In an embodiment, scheduler 234 may initiate a sequence of events that may result in or more packets being transmitted. Scheduler 234 may comprise logic 230 that initiates sequence of events, and may be comprised on packet processing device 236.

In an embodiment, packet processing device 226 may additionally comprise queue manager 312. Queue manager 312 may keep track of the state of packet descriptor queue 212, as well as packet descriptors 304A, 304B, . . . , 304N. In an embodiment, queue manager 312 may maintain queue descriptor 306 to track the states of packet descriptor queue 212 and packet descriptors 304A, 304B, . . . , 304N. Queue descriptor 600 may comprise, for example, committed cell count to indicate the number of segments that have been successfully transmitted from the corresponding queue; queue count to indicate the total number of segments in the queue; and a scheduler sequence number to indicate the location of the scheduler 234 within the buffer chain. In an illustrated embodiment, queue descriptor 306 may comprise the following information (in addition to examples listed, and/or other information):

Scheduler pointer 306A: references an entry in packet descriptor queue 212 for which a corresponding packet descriptor copy has been stored on cache 210. In an embodiment, when flow control is not enabled, scheduler pointer 306A may point to the last entry that was copied to on-device memory; and when flow control is enabled, scheduler pointer 306A may point to the next entry to be copied to on-device memory. However, this may merely be an implementation detail, and embodiments are not restricted to this. This pointer may be updated when packet descriptor queue 212 is in fill state (discussed below), or when a schedule request is received. Scheduler pointer 306A may be updated in conjunction with a packet descriptor copy being stored on cache 210. This means that packet descriptor copy may be stored on cache 210 prior to updating scheduler pointer 306A; or that scheduler pointer 306A may be updated prior to storing packet descriptor copy on cache 210; or that these events may occur substantially simultaneously.

Commit pointer 306B: references an entry at head of packet descriptor queue 212 for which a commit request has not been received, where the commit request indicates that a packet has been successfully transmitted. This pointer may be updated when queue manager 312 receives a commit request, where the commit request indicates that the corresponding packet has been transmitted.

Enqueue pointer 306C: references the last entry in packet descriptor queue 212. This pointer may be updated when a packet, such as packet 240, is stored in packet descriptor queue 212.

Queue state 306D: tracks state of packet descriptor queue 212 to determine, for example, whether to store a packet descriptor copy on cache 210. In an embodiment, queue state may comprise a fill state and a no-fill state. In fill state, queue manager 312 may store a packet descriptor copy on the on-device memory (e.g., cache 210) in the absence of receiving a schedule request. In no-fill state, a packet descriptor copy is not stored on the on-device memory (e.g., cache 210) unless a schedule request is received.

In an embodiment, for example, fill state may be indicated by empty state, single buffer state, and two buffer state. If packet descriptor queue 212 is empty (i.e., no packet descriptors) or has one or two packet descriptors, then a packet descriptor copy may be stored on cache 210. In an embodiment, fill state may comprise up to two buffer state to achieve good fill latency performance. However, without departing from embodiments of the invention, the fill state may be indicated by just empty state and single buffer state, or alternatively, may be indicated by other than two buffer state (e.g., three buffer state, four buffer state, etc.). Fill state, however, may comprise N-buffer state, where N may be a number determined to be reasonable for a given implementation.

Furthermore, no-fill state may be indicated by multiple buffer state and roll back done state. Multiple buffer state refers to a state in which packet descriptor queue 212 has transitioned to a state indicative of more than a specified number of packet descriptors. In multiple buffer state, queue manager 312 does not store a packet descriptor copy on cache 210 unless a schedule request is received.

If the transmit queue being used is flow controlled, queue manager 312 may perform a roll back operation. Transmit queue refers to a queue of packets scheduled for transmission by scheduler 234. When a transmit queue is flow controlled, a flow control process (e.g., external back pressure) may prohibit transmission of one or more packets in the transmit queue. Consequently, packets that were scheduled for transmission from a transmit engine, for example, are dropped. In an embodiment, transmit engine may indicate a "dropped packets notification" to the queue manager 312, and queue manager 312 may initiate a roll back operation to maintain coherency between the on-device memory (e.g., cache 210) and the off-device memory (e.g., packet descriptor queue 212). Further detail follows.

In a roll back operation, queue manager 312 may reset scheduler pointer 306A, and transition queue state 306D from multiple buffer state to roll back done state. When scheduler pointer 306A is reset, it is pointed back to an entry 304A, 304B, . . . , 304N in packet descriptor queue 212 that has not yet been transmitted (i.e., no commit request has been received). In an embodiment, upon completing this task, scheduler pointer 306A and commit pointer 306B should reference the same entry. This ensures that the final state of packet descriptor queue 212 accurately represents those entries that were successfully transmitted.

In roll back done state, since the entries in cache 210 have already been scheduled and then dropped, these entries need to be invalidated and rescheduled. In an embodiment, cache manager 310 may invalidate entries 302A, 302B in cache 210. Furthermore, queue manager 312 may replenish the on-device memory (e.g., cache 210) with a number of packet descriptors from off-device memory (e.g., packet descriptor queue 212) from head of packet descriptor queue 212. For example, in an embodiment, the number of packet descriptors from off-device memory (e.g., packet descriptor queue 212) that are used to replenish on-device memory (e.g., cache 210) is 2. However, this number may be different without departing from embodiments of the invention.

When on-device memory (e.g., cache 210) is replenished, queue manager 312 may update scheduler pointer 306A to point to an element stored on off-device memory (e.g., packet descriptor queue 212) that has not been copied to on-device memory (e.g., cache 210).

Figure 6A:
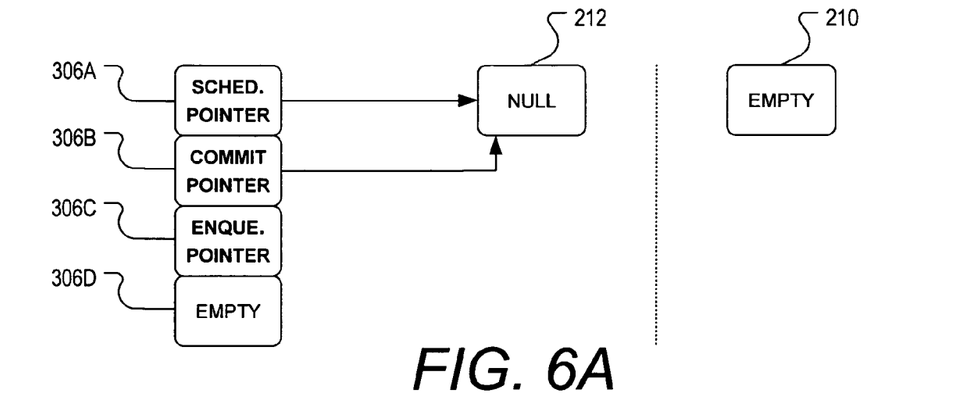
FIGS. 6A-6G illustrate a sequence according to an embodiment of the invention.

FIGS. 6A-6F are block diagrams illustrating a series of queue and packet descriptor states according to an embodiment of the invention. In FIG. 6A, each of scheduler pointer 306A, commit pointer 306B, and enqueue pointer 306C points to null in packet descriptor buffer 212 (i.e., packet descriptor buffer 212 is empty), and queue state 306D is in empty state. Furthermore, cache 210 is empty.

Figure 6B:
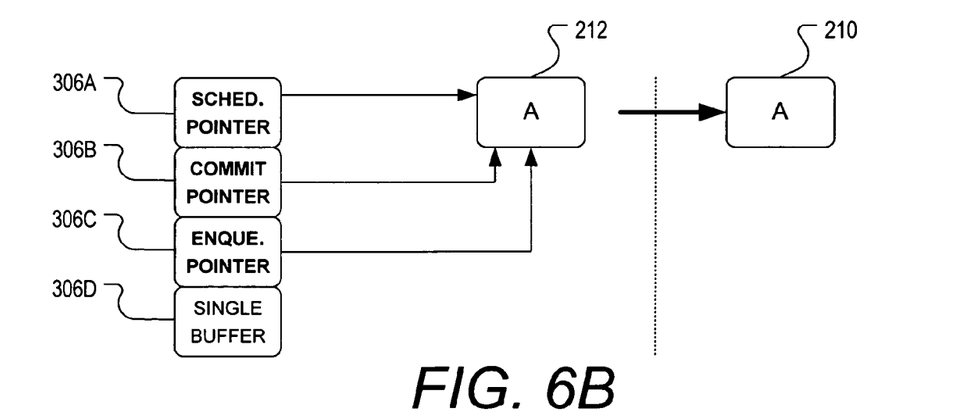

In FIG. 6B, packet descriptor A is enqueued to packet descriptor queue 212, and queue state 306D transitions to single buffer state. In an embodiment, since single buffer state is a fill state, queue manager 312 also updates the scheduler pointer 306A to point to A, and sends a packet descriptor copy of A to cache 210. Furthermore, commit pointer 306B is updated to point to A to indicate that A will be the next packet descriptor for which a commit request is expected for the corresponding packet, and enqueue pointer 306C is updated to point to A to indicate that A is the last packet descriptor on packet descriptor queue 212.

Figure 6C:
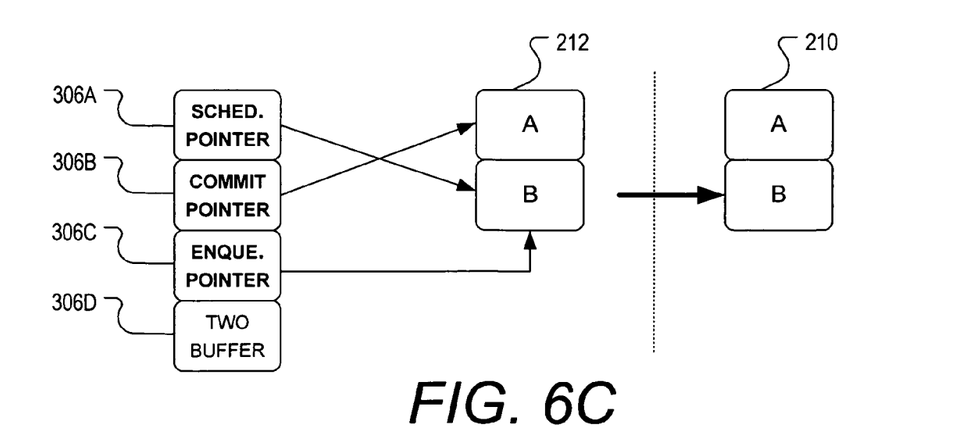

In FIG. 6C, packet descriptor B is enqueued to packet descriptor queue 212, and queue state 306D transitions to two buffer state. In an embodiment, since two buffer state is a fill state, queue manager 312 also updates the scheduler pointer 306A to point to B, and sends a packet descriptor copy of B to cache 210. Commit pointer 306B still points to A to indicate that A will be the next packet descriptor for which a commit request is expected for the corresponding packet, but enqueue pointer 306C is updated to point to B to indicate that B is the last packet descriptor on packet descriptor queue 212.

Figure 6D:
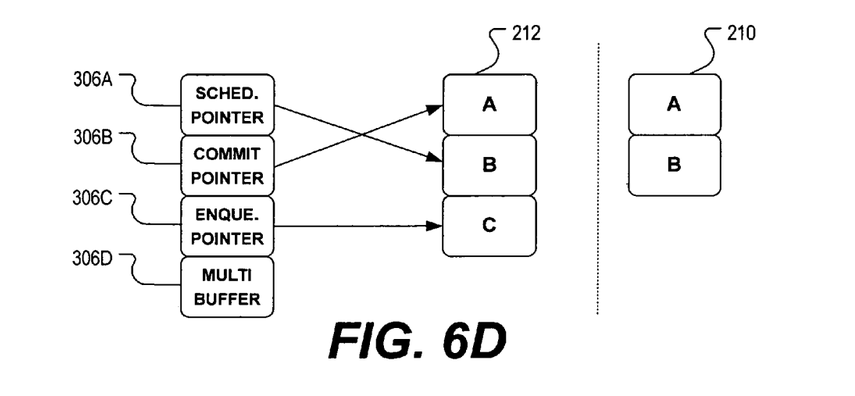

In FIG. 6D, packet descriptor C is enqueued to packet descriptor queue 212, and queue state 306D transitions to multi buffer state. In an embodiment, since multi buffer state is a no-fill state, queue manager 312 does not update the scheduler pointer 306A, and also does not send a packet descriptor copy of C to cache 210. Therefore, scheduler pointer 306A is not updated and remains pointed to B. Commit pointer 306B still points to A to indicate that A will be the next packet descriptor for which a commit request is expected for the corresponding packet, but enqueue pointer 306C is updated to point to C to indicate that C is the last packet descriptor on packet descriptor queue 212.

Figure 6E:
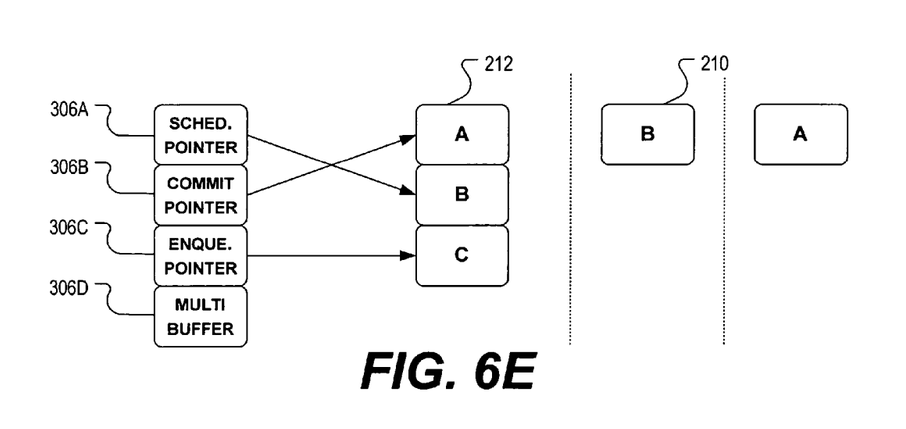

In FIG. 6E, packet descriptor A is scheduled for transmission (depicted in the last column). For example, packet descriptor A may be placed in a transmit queue (not shown), where a transmit engine (also not shown) may retrieve entries for transmission. Note that no pointers are updated.

Figure 6F:
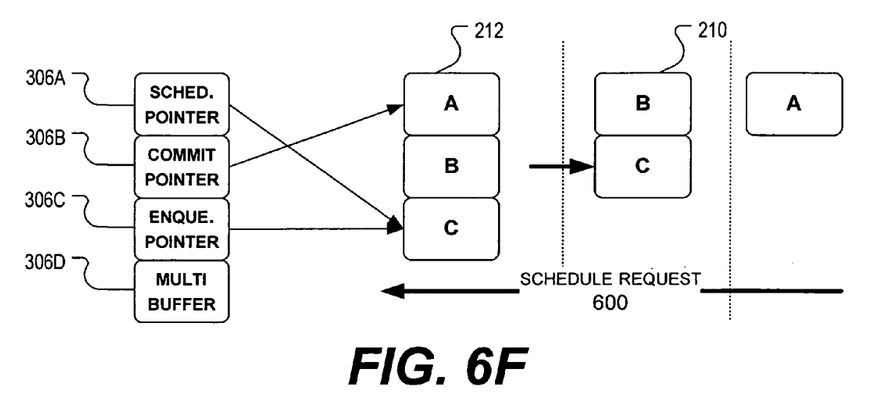

In FIG. 6F, in response to a packet descriptor being scheduled for transmission from packet descriptor queue 212, cache manager 310 may send a schedule request 600 to queue manager 312 to prompt queue manager 312 to replenish cache 210. Queue manager 312 may respond to schedule request 600 by replenishing cache 210. Queue manager 312 may update scheduler pointer 306A to the next packet descriptor in packet descriptor queue 212, packet descriptor C, and transmit packet descriptor copy of packet descriptor C to cache 210.

Figure 6G:
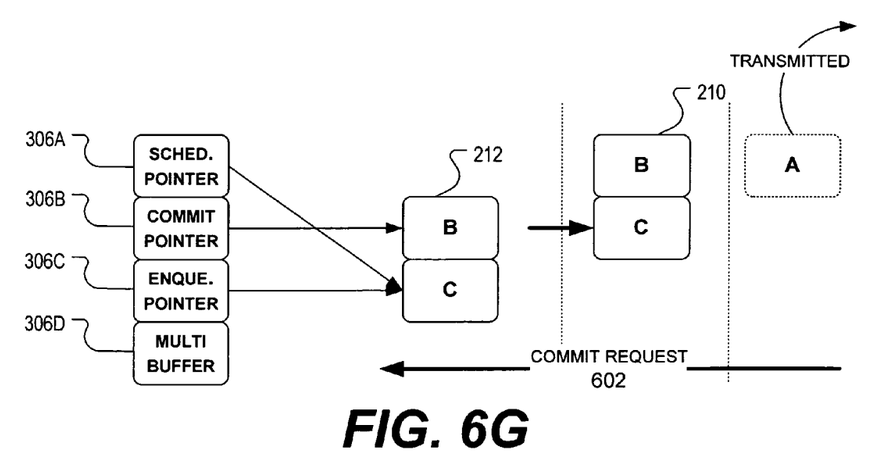

In FIG. 6G, commit request 602 is received to indicate that a scheduled packet has been transmitted. In response thereto, commit pointer 306B is updated to the next entry in packet descriptor queue 212. Furthermore, queue manager 312 may permanently remove the transmitted entry from packet descriptor queue 212.

FIGS. 7A-7E are block diagrams illustrating a series of queue and packet descriptors states according to another embodiment of the invention. In FIGS. 7A-7E, packet descriptor queue 212 may be flow controlled.

Figure 7A:
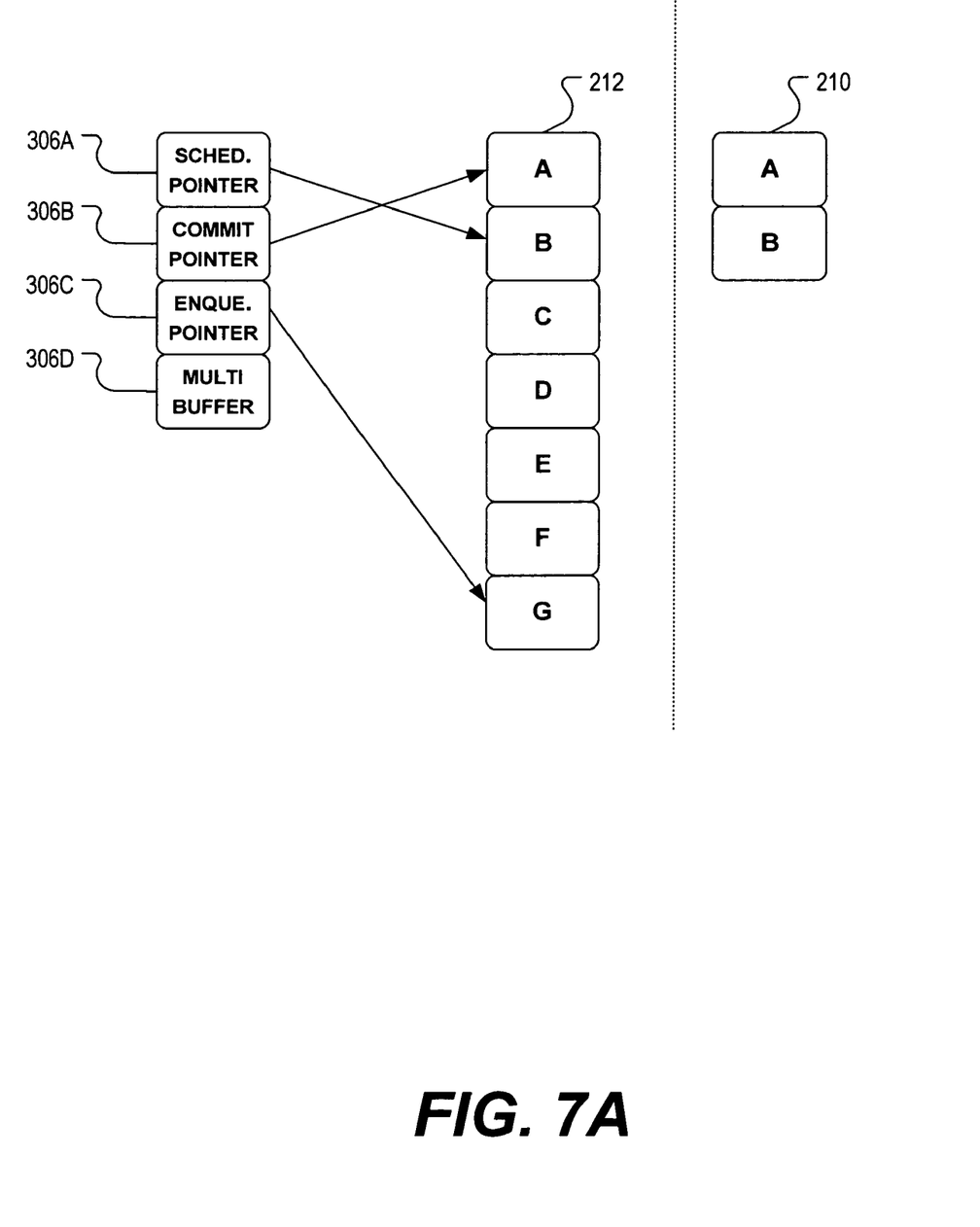
FIGS. 7A-7E illustrate a sequence according to another embodiment of the invention.

In FIG. 7A, states of packet descriptor queue 212 and packet descriptors are similar to the states illustrated and described in FIG. 6D, except that in FIG. 7A, packet descriptors D, E, F, and G have been added to packet descriptor queue 212. Commit pointer 306B still points to A to indicate that A will be the next packet descriptor for which a commit request is expected for the corresponding packet, but enqueue pointer 306C is updated to point to G to indicate that G is the last packet descriptor on packet descriptor queue 212.

Figure 7B:
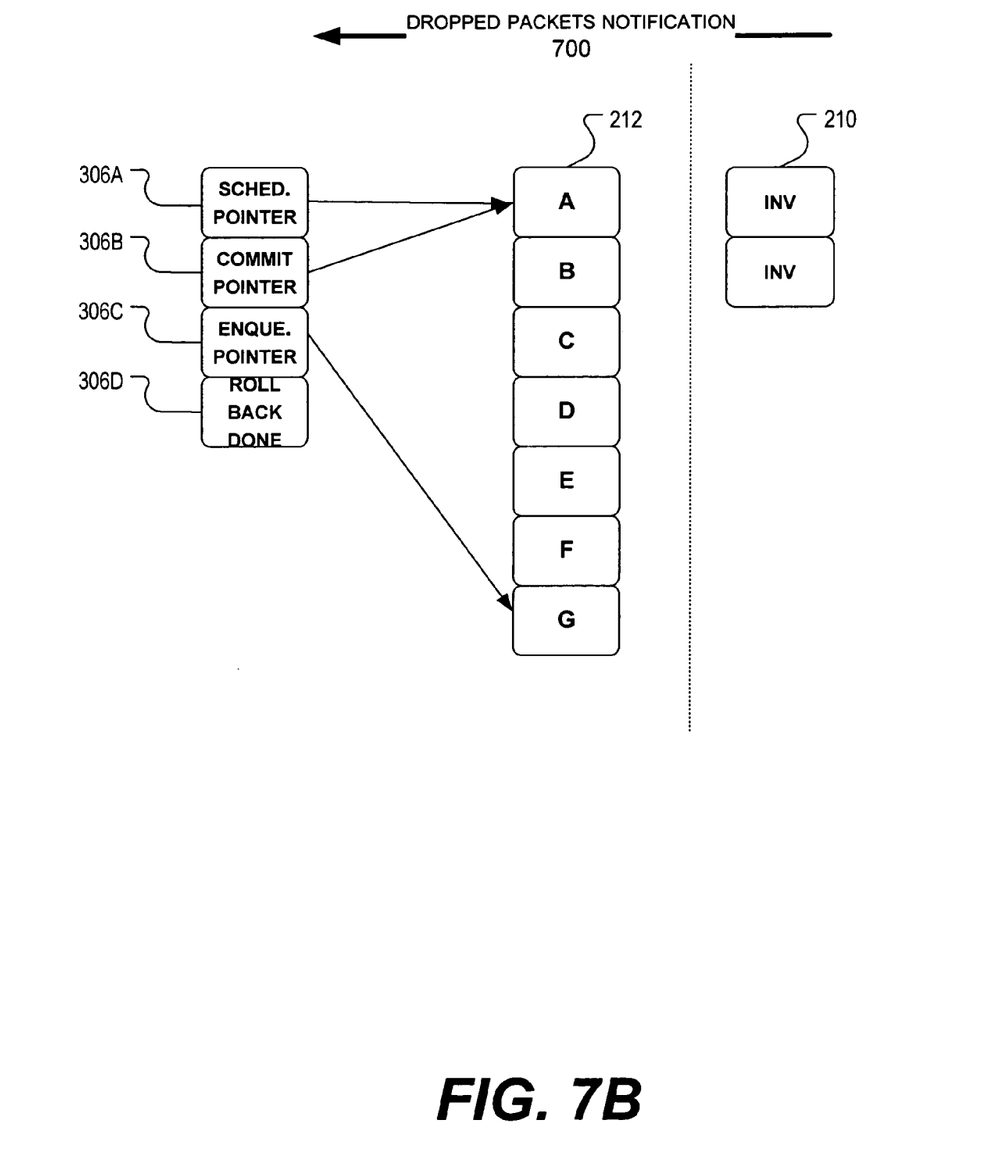

In FIG. 7B, a roll back operation is performed in response to a dropped packets notification 700. Since packet descriptor queue 212 is flow controlled, packets corresponding to packet descriptors A and B are dropped after they are scheduled, but before they are transmitted. In roll back mode, queue manager 312 resets scheduler pointer 306A to entry in packet descriptor queue 212 for which no commit request has been received for the corresponding packet, in this case packet descriptor A. Furthermore, cache manager 310 invalidates ("INV") the entries in cache 210, in this case packet descriptors A and B, so that these can be rescheduled for transmission. Queue state 306D may transition to roll back done state.

Figure 7C:
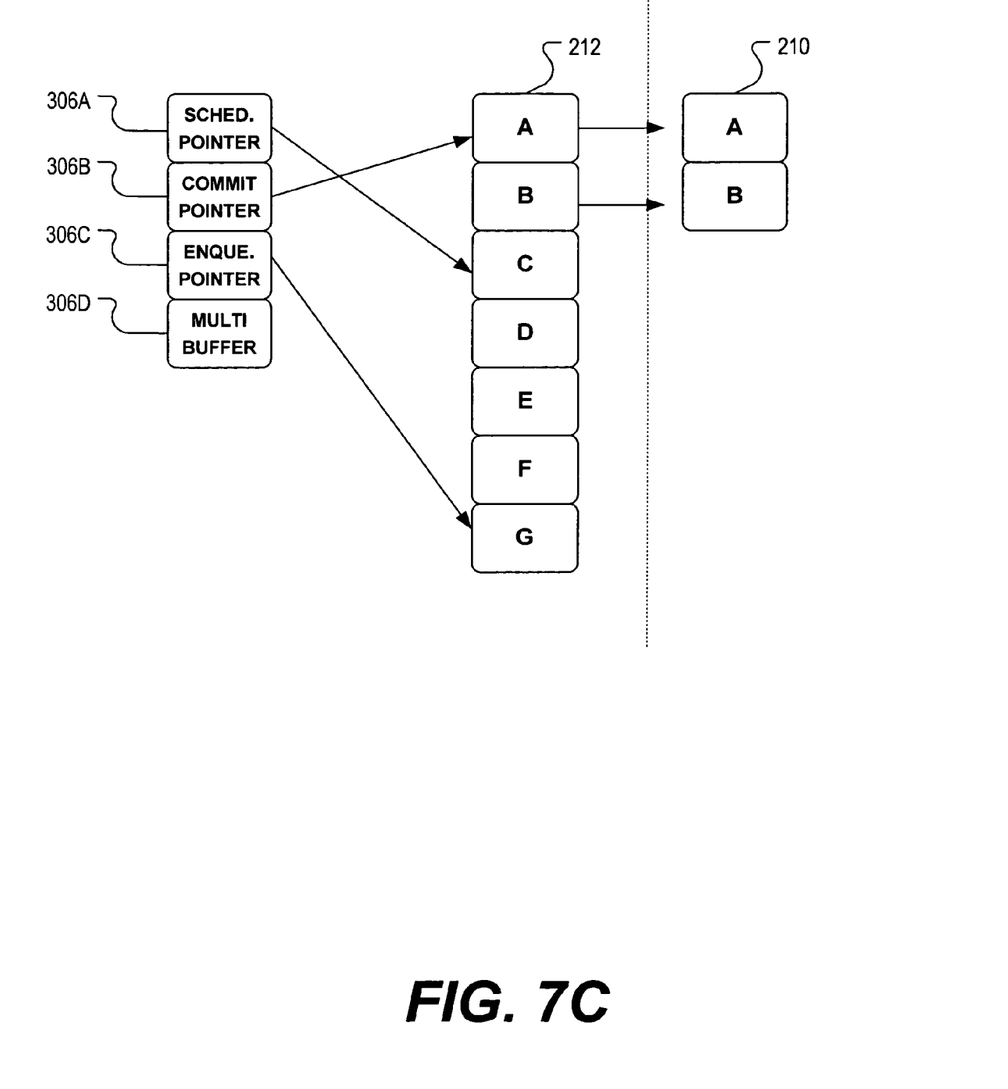

In FIG. 7C, queue manager 312 transfers head elements, 2 for example, from packet descriptor queue 212 to cache. For example, elements A and B may be transferred to cache 210. Queue manager 312 may then update scheduler pointer 306A to the next entry from which cache 210 will be replenished. Queue manager 312 may then transition queue state 306D from roll back done state to multi buffer state.

Figure 7D:
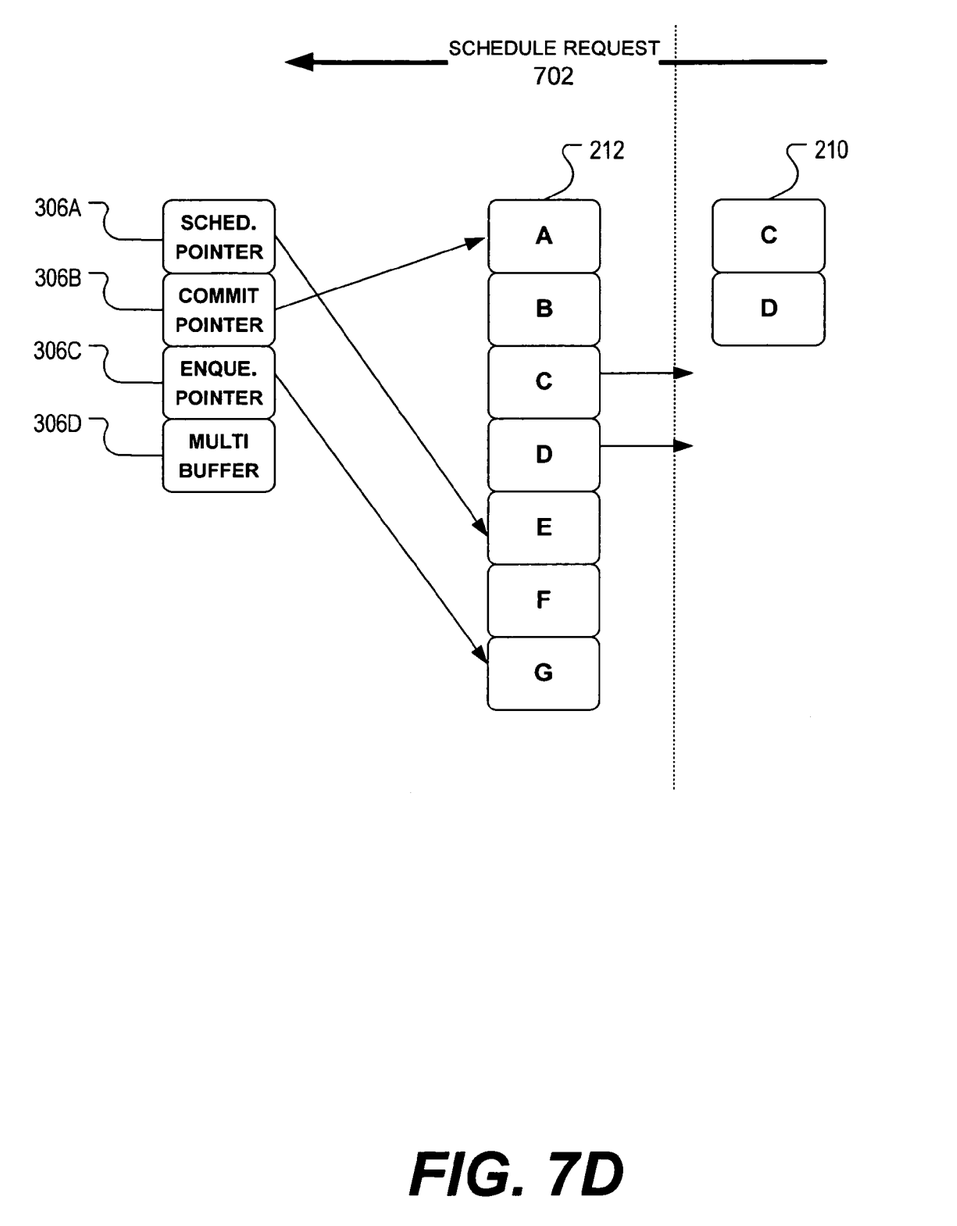

In FIG. 7D, cache manager 310 sends a schedule request 702 to queue manager 312. In response to the schedule request 702, queue manager 312 stores the next elements, in this case packet descriptor copies C and D, to cache 210. Queue manager 312 may then update scheduler pointer 306A to E, which is the next entry from which cache 210 will be replenished.

Figure 7E:
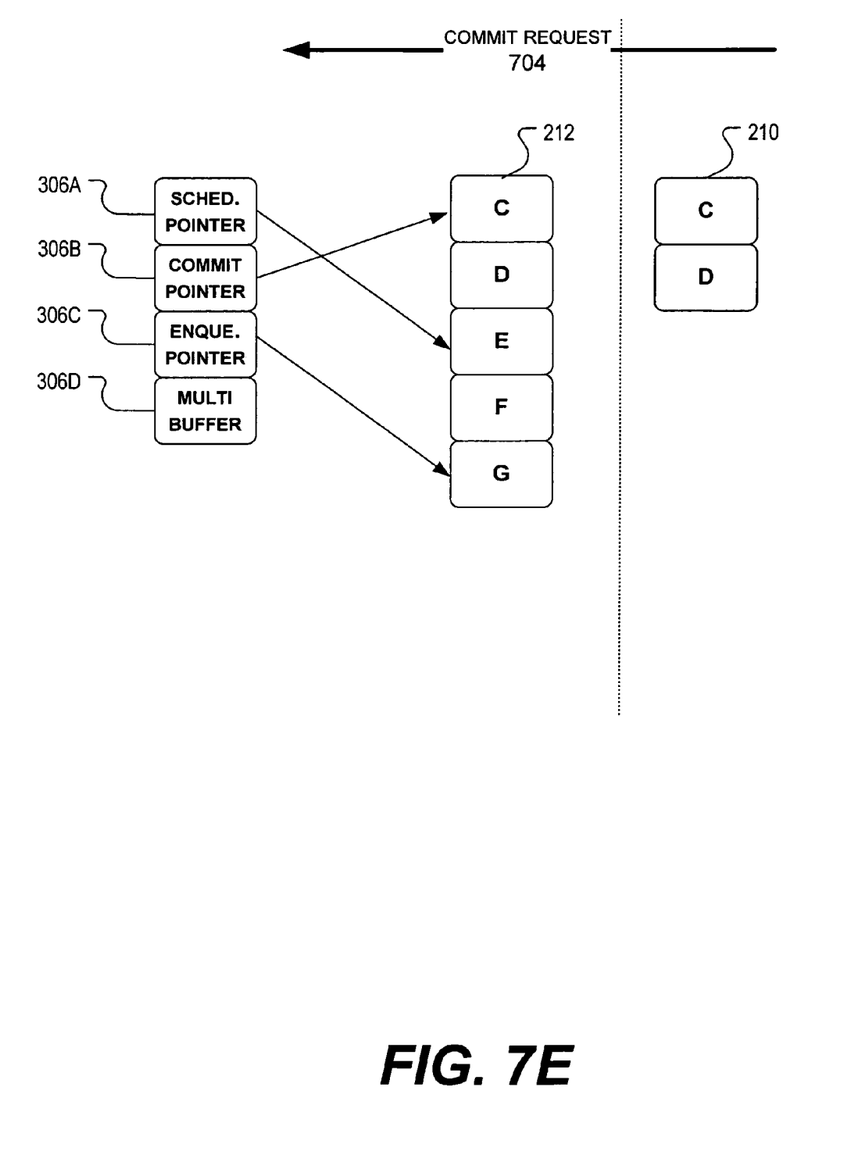

In FIG. 7E, A and B are successfully transmitted. In response thereto, a commit request 704 for packet descriptors A and B is received. Commit pointer 306B is updated to point to packet descriptor C. Subsequently, if elements C and D are scheduled and then dropped from transmission, a roll back operation may be performed by resetting scheduler pointer 306A to point to the same entry as commit pointer 306B (i.e., the entry for which a commit request is expected for a corresponding packet); rescheduling the next head elements from the packet descriptor queue 212; updating scheduler pointer 306A; and awaiting a schedule request 702 to replenish cache 210.

CONCLUSION

Therefore, in an embodiment, a method comprises in response to receiving a packet at a packet processing device having a memory ("on-device memory"), storing the packet at a location in a memory not on the packet processing device ("off-device memory"); creating a packet descriptor corresponding to the packet, the packet descriptor referencing the location; storing the packet descriptor in a packet descriptor queue on the off-device memory; and storing a packet descriptor copy on the on-device memory.

Embodiments of the invention may provide a scheme that enables an packet processing device scheduler to access packet length information in an efficient manner. By storing packet descriptors information, such as packet length, in on-device memory, information may be retrieved in a much more efficient and timely manner. Since the latency to access information from off-chip memory may be hundreds of cycles, a scheduler may not be able to operate in real-time relative to the data that is being transmitted. By accessing data from on-device memory, the latency may be reduced many times over, e.g., to 1-4 cycles. This results in reduced latency and bandwidth. Furthermore, the scheme is streamlined so that only a subset of all packet descriptors are stored in on-device memory. Embodiments of the invention also enable a scheme to replenish the on-device memory, as well as a method to maintain coherency between the off-device memory and on-device memory where flow control is used.

In the foregoing specification, the invention has been described with reference to specific embodiments thereof. It will, however, be evident that various modifications and changes may be made to these embodiments without departing therefrom. The specification and drawings are, accordingly, to be regarded in an illustrative rather than a restrictive sense.

What is claimed is:

1. A method comprising:
   in response to receiving a packet at a packet processing device having a memory ("on-device memory"), storing the packet at a location in a memory not on the packet processing device ("off-device memory");
   creating a packet descriptor corresponding to the packet, the packet descriptor referencing the location;
   storing the packet descriptor in a packet descriptor queue on the off-device memory;
   storing a packet descriptor copy on the on-device memory; and
   updating a queue state to one of a fill state or a no-fill state.

2. The method of claim 1, additionally comprising storing a packet descriptor copy on the on-device memory if the queue state is in the fill state.

3. The method of claim 2, additionally comprising updating the scheduler pointer to a next position on the packet descriptor queue in conjunction with storing the packet descriptor copy on the on-device memory.

4. The method of claim 3, additionally comprising scheduling the packet for transmission from the packet processing device by: accessing the packet descriptor copy from the on-device memory, wherein the packet descriptor copy includes packet length information; and using the packet length information to schedule the packet for transmission.

5. The method of claim 4, additionally comprising updating a commit pointer to a next position on the packet descriptor queue in response to successful transmission of the packet.

6. The method of claim 4, wherein another packet descriptor copy is accessed from the on-device memory and scheduled for transmission.

7. The method of claim 4, additionally comprising performing a roll-back operation if flow control is enabled.

8. An apparatus comprising:
   logic to:
      in response to receiving a packet at a NIC having a memory ("on-device memory"), store the packet at a location in a memory not on the NIC ("off-device memory");
      create a packet descriptor corresponding to the packet, the packet descriptor referencing the location;
      store the packet descriptor in a packet descriptor queue on the off-device memory;
      store a packet descriptor copy on the on-device memory; and
      update a queue state to one of a fill state or a no-fill state.

9. The apparatus of claim 8, additionally comprising storing a packet descriptor copy on the on-device memory if the queue state is in the fill state.

10. The apparatus of claim 9, additionally comprising scheduling the packet for transmission from the packet processing device by:
    accessing the packet descriptor copy from the on-device memory, wherein the packet descriptor copy includes packet length information; and
    using the packet length information to schedule the packet for transmission.

11. The apparatus of claim 10, additionally comprising updating a commit pointer to a next position on the packet descriptor queue in response to successful transmission of the packet.

12. The apparatus of claim 10, additionally comprising performing a roll-back operation if flow control is enabled.

13. A system comprising:
    a circuit board;
    a network interface card ("NIC") coupled to the circuit board; and
    logic to:
       in response to receiving a packet at the NIC having a memory ("on-device memory"), storing the packet at a location in a memory not on the NIC ("off-device memory");
       creating a packet descriptor corresponding to the packet, the packet descriptor referencing the location;
       storing the packet descriptor in a packet descriptor queue on the off-device memory;
       storing a packet descriptor copy on the on-device memory; and
       updating a queue state to one of a fill state or a no-fill state.

14. The system of claim 13, additionally comprising storing a packet descriptor copy on the on-device memory if the queue state is in the fill state.

15. The system of claim 14, additionally comprising scheduling the packet for transmission from the packet processing device by:
    accessing the packet descriptor copy from the on-device memory, wherein the packet descriptor copy includes packet length information; and
    using the packet length information to schedule the packet for transmission.

16. The system of claim 15, additionally comprising performing a roll-back operation if flow control is enabled.

17. An article of manufacture having stored thereon instructions, the instructions when executed by a machine, result in the following:
    in response to receiving a packet at a packet processing device having a memory ("on-device memory"), storing the packet at a location in a memory not on the packet processing device ("off-device memory");
    creating a packet descriptor corresponding to the packet, the packet descriptor referencing the location;
    storing the packet descriptor in a packet descriptor queue on the off-device memory;
    storing a packet descriptor copy on the on-device memory; and
    updating a queue state to one of a fill state or a no-fill state.

18. The article of manufacture of claim 17, additionally comprising storing a packet descriptor copy on the on-device memory if the queue state is in the fill state.

19. The article of manufacture of claim 18, additionally comprising scheduling the packet for transmission from the packet processing device by:

accessing the packet descriptor copy from the on-device memory, wherein the packet descriptor copy includes packet length information; and using the packet length information to schedule the packet for transmission.

20. The article of manufacture of claim 19, additionally comprising updating a commit pointer to a next position on the packet descriptor queue in response to successful transmission of the packet.

21. The article of manufacture of claim 19, additionally comprising performing a roll-back operation if flow control is enabled.

* * * * *